INVENTOR.
RAYMOND L. BROWN

BY
Thomas C. Betts
HIS ATTORNEY

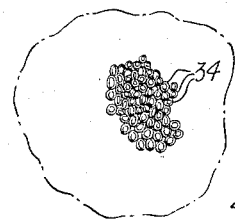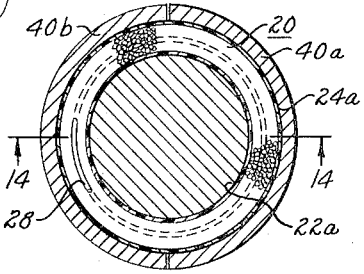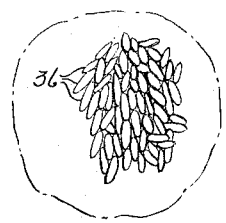
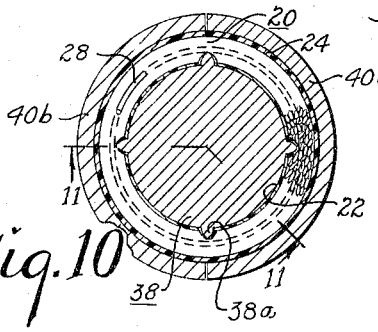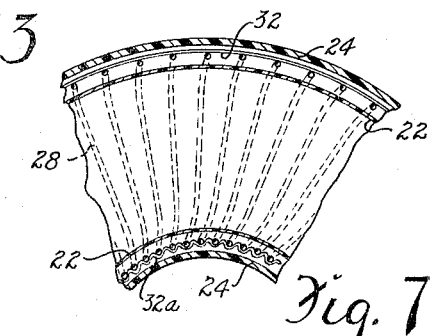
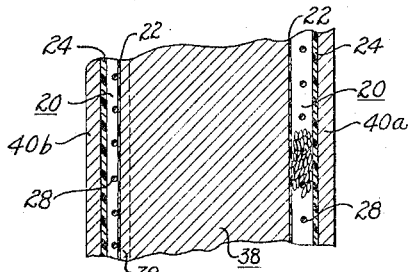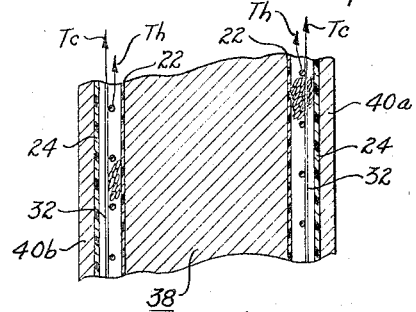
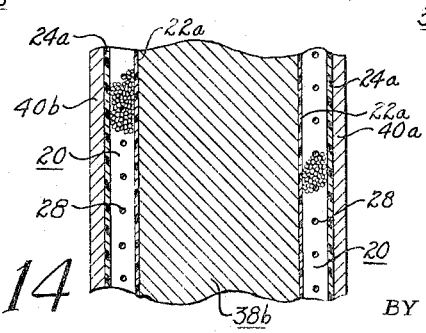

United States Patent Office 3,289,703
Patented Dec. 6, 1966

3,289,703
FLEXIBLE HOSE AND METHOD OF MAKING THE SAME
Raymond L. Brown, Banksville, N.Y., assignor to Electrolux Corporation, Old Greenwich, Conn., a corporation of Delaware
Filed Dec. 20, 1963, Ser. No. 332,160
10 Claims. (Cl. 138—125)

This invention pertains, in general, to flexible hoses, or conduits; and, in particular, to a new and improved flexible hose, or conduit, wherein, according to one illustrative embodiment thereof, a flexible reinforcing coil is longitudinally embedded in a tubular body of a foamed, or cellular, elastic material, e.g., plastics such as vinyl, urethane, polyethylene, or the like, is a foamed, or cellular, form.

Flexible hoses are employed for many purposes. One application, among many, of the flexible hose is to couple the suction nozzle of a vacuum cleaner with a collection chamber so that dust, lint and larger debris can be conveyed from the suction nozzle to the collection chamber, or dust bag, of the cleaner. Ideally, the flexible hose should be relatively light in weight, relatively unbulky and it should have a relatively high degree of flexibility so that it can be easily manipulated during the cleaning operation. Moreover, such a hose, or conduit, should be adaptable for easy fabrication. It should have a minimum number of component parts and its should be suited for high-rate mass manufacture at low unit cost.

Accordingly, the general object of the present invention is to provide a new and improved flexible hose, or conduit.

Another object is to provide a lightweight, low-bulk hose, or conduit, which is highly flexible to permit bending of the hose at relatively small radii of curvature.

Another object is to provide a flexible hose, or conduit, which has a minimum number of component parts and which is adapted for high-rate mass production at relatively low unit cost.

Another object is to provide a flexible hose, or conduit, which is reinforced circumferentially as well as longitudinally.

Another object is to provide a flexible hose, or conduit, which, according to one embodiment of the invention, may be longitudinally stretched to a substantial degree.

According to one illustrative embodiment of the invention, there is provided a hose wherein a long coil of resilient material, such as steel wire or the like, is embedded in a matrix of a foamed, or cellular, elastic material, such as urethane, vinyl, polyethylene or the like; the foamed, or cellular, matrix being generally in the shape of a hollow cylindrical body or tubulation.

One feature of the invention is that a foamed, or cellular, elastic material is used for the tubular hose body.

Also, according to another feature of the invention, the outer wall surface and the inner wall surface of the foamed, or cellular, tubular hose body are provided with impervious skins, by suitable treatment of the hose body.

According to another feature of the invention, the outer wall skin may be suitably textured, or embossed, so as to provide a finished appearance simulating a braided covering jacket. Advantageously, with the hose construction of the present invention the conventional braided jacket may be eliminated. Also, due to the embossing, the subject hose has a frictioned outer wall thereby making the hose easier to handle and manipulate.

According to another feature of the invention thin, tubular jackets of solid, elastic, plastic material, such as a vinyl plastic or the like, may be employed to cover the outer and inner wall surfaces of the tubular hose body thereby eliminating the need to form skins on the outer and inner wall surfaces of the body.

According to another feature of the invention there is embedded in the foamed, or cellular, hose body together with the long resilient coil spring, which primarily reinforces the body circumferentially, reinforcing cords, or like means, which primarily reinforce the hose body longitudinally; the reinforced hose being, nevertheless, bendable.

According to still another feature of the invention, the aforementioned longitudinal reinforcing cords are emplaced in the foamed, or cellular, hose body in such a way that the cords have a certain degree of slackness so that when bending the hose the cords on the outside of the bend become more taut while those on the inside of the bend are further slackened.

Further objects and advantages of the invention will become apparent from the following description, considered in connection with the accompanying drawings of which:

FIG. 7 is a cross-sectional view of the hose of FIGS. 5 and 6, showing the hose in its bent condition;

FIG. 8 is an enlarged sectional view showing an open-celled cellular structure of the foamed, elastic material which may be used to form the hose body per se;

FIG. 9 is an enlarged sectional view showing, as an alternative, a closed-cell cellular structure of the foamed, elastic material which may be used to form the hose body per se;

FIG. 10 is an end view of a cross-section of a mold which may be used in casting the coil-reinforced hose according to the embodiment of FIGS. 1–3;

FIG. 11 is a view of a longitudinal cross-section of the mold of FIG. 10, as viewed along the section line 11—11 in FIG. 10;

FIG. 12 is a view, similar to FIG. 11, showing one way of casting the coil-and-cord reinforced hose of the embodiment shown at FIGS. 5, 6 and 7;

FIG. 13 is an end view of a cross-section of a mold which may be employed in casting the coil-reinforced hose of the embodiment shown at FIG. 4; and, FIG. 14 is a view of a longitudinal cross-section of the mold of FIG. 13, as viewed along the section line 14—14 in FIG. 13.

Figure 1:
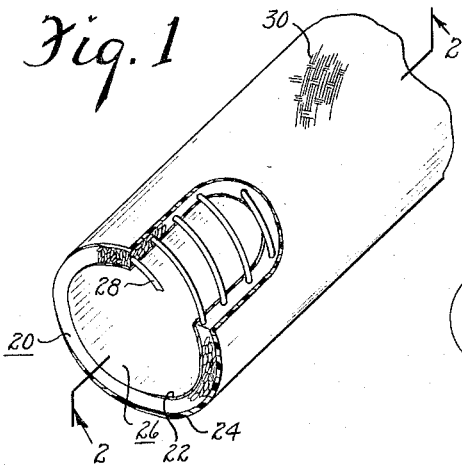
FIG. 1 is a perspective view, partly cut-away, of a longitudinal section of a hose according to one embodiment of the present invention.
Figure 2:
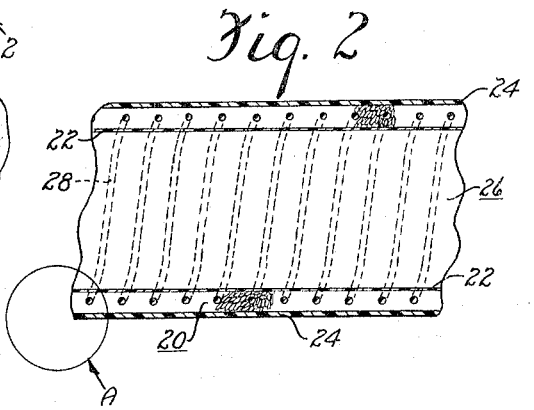
FIG. 2 is a longitudinal cross-sectional view of the hose shown in FIG. 1, as viewed along the section line 2—2 of FIG. 1.
Figure 3:
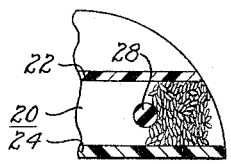
FIG. 3 is a magnified view of the section of hose of FIG. 2, the magnification being of area A of FIG. 2.

The first embodiment of the invention is illustrated in FIGS. 1, 2 and 3. As shown, a tubular body 20 of a foamed, or cellular, elastic material has a duct 26 extending coaxially therethrough. Embedded between the inner and outer wall portions 22 and 24 of the body 20 is the helical coil spring 28, the longitudinal axis of which extends coaxially along the longitudinal axis of the tubular body 20. This helical coil spring 28 serves, primarily, to circumferentially reinforce the tubular body 20, as well as providing some degree of longitudinal reinforcement along its entire length.

In the embodiment of the hose shown at FIGS. 1–3 the foamed, or cellular elastic material defining the tubular body 20 is of a closed-cell cellular construction; the closed-cell cellular construction being illustrated at FIG. 9 and described hereinafter. The inner and outer wall portions 22 and 24 are relatively thin impervious skins of the elastic material integrally formed of the elastic material when the body 20 is formed; e.g., by a casting process such as is hereinafter described with reference to FIGS. 10–12.

On the outer wall surface of the outer wall portion, or skin, 24 there is provided an embossed surface 30 which, although not shown in the drawings, may cover the entire outer wall 24 of the hose body. The embossed surface 30 simulates the appearance of the conventional braided jacket which is often used as a covering for vacuum cleaner suction hose.

Plastic materials such as vinyl, urethane, polyethylene, or the like, in a foamed, or cellular, form are suitable for fabricating the tubular body 20. Resilient steel or resilient plastics, such as an acetal resin or a polycarbonate resin, or the like, may be employed to form the helical coil spring 28.

As shown in the magnified sectional view in FIG. 3 the thickness of the outer wall portion, or skin, 24 may be a little greater than the thickness of the inner wall portion, or skin, 22, so that the hose when bent can sufficiently withstand the different stresses imparted to these wall portions; the outer wall portion 24 being subjected to a greater stress than the inner wall portion 22 during bending of the hose.

Advantageously, with the construction shown at FIGS. 1–3, such a hose can be extended along its longitudinal dimension to a substantial degree.

Figure 4:
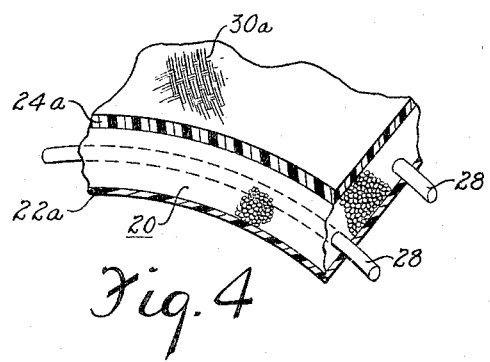
FIG. 4 is an enlarged perspective view of a sector of a cross-section, or end, of a hose similar to the hose shown in FIG. 1, except that a different wall construction of the hose body is provided.

Another embodiment of the invention is shown at FIG. 4 wherein, instead of forming impervious skins integral with the cellular elastic material of the body 20 to define the inner and outer wall portions 22 and 24 as indicated in FIGS. 1–3, the inner and outer wall portions 22a and 24a of the body 20 are in the form of relatively thin, concentric tubes of of impervious solid elastic material bonded to the cellular elastic body 20. The thin tubes forming the inner and outer wall portions 22a and 24a may, for example, be a vinyl plastic or like material. In the embodiment shown at FIG. 4, it is to be understood that cellular elastic material of the body 20 may be of an open-celled cellular construction or a closed-cell cellular construction. The open and closed cell construction of the material of the body 20 are hereinafter described with reference to FIGS. 8 and 9.

Figure 5:
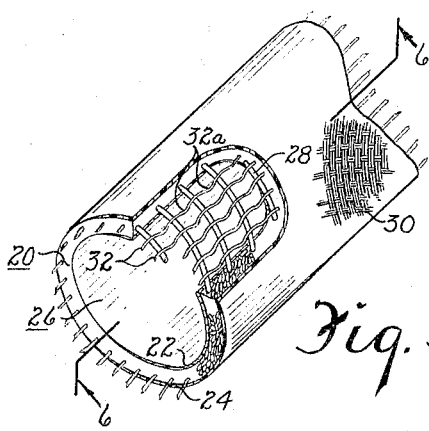
FIG. 5 is a perspective view, partly cut-away of a longitudinal section of a hose according to still another embodiment of the present invention.
Figure 6:
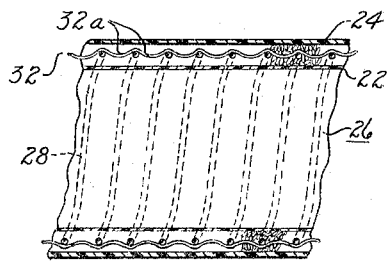
FIG. 6 is a longitudinal cross-section of the hose shown in FIG. 5, as viewed along the section line 6—6 of FIG. 5.

Another embodiment of the invention is illustrated in FIGS. 5, 6 and 7. Since the embodiment illustrated in FIGS. 5, 6 and 7 is similar to that shown in FIGS. 1–3, parts common to both of these embodiments are identified by like reference numbers in the drawings. The difference between the embodiment of the hose shown in FIGS. 5, 6 and 7 and that shown in FIGS. 1–3 is that longitudinal reinforcing cord-like members 32 are employed. As shown, there is a plurality of long cords, or cord-like members, 32 which are equally spaced about the periphery of the helical coil spring 28. These cords 32 extend longitudinally through the tubular body 20 and are embedded therein, between the inner and outer wall portions 22 and 24, together with the helical coil spring 28. As is more clearly illustrated in FIG. 6, in the normal unstretched and unbent condition of the hose each of the cords 32 has a number of slack portions 32a between adjacent turns of the helical coil spring 28.

FIG. 7 shows the attitude assumed by the cords 32 and helical coil 28 when the hose is bent. As shown, when the hose's tubular body 20 is bent arcuately, the cords 32 on the outside of the bend become more taut while those on the inside of the bend become more slackened, as indicated by the more pronounced slack portions 32a.

The cords, or cord-like members, 32 may be fashioned from plastic, Fiberglas, or the like.

FIGS. 8 and 9 illustrate the cellular construction of the two different kinds of foamed material which may be employed in fabricating the hose body 20. As shown at FIG. 8, the elastic material is comprised of a group of substantially open cells 34 which are contiguous; the structure of the cellular material in FIG. 8 being sponge-like. As an alternative, the cellular structure illustrated at FIG. 9 may be employed. In FIG. 9 there is a group of closed cells 36 which are contiguous. Each of the cells 36 is enclosed by a relatively thin film of the elastic material. One advantage in using the cellular structure shown at FIG. 9 is that substantially the entire hose body 20 will be water impervious.

FIGS. 10 and 11 are illustrative of one method, a casting method, by which the hose of FIGS. 1–3 may be achieved. Loosely wound about a core 38 is the helical spring 28. The core 38 together with the semi-circular outer wall sections 40a and 40b define a mold for making the subject hose. As indicated, these outer wall sections 40a and 40b can be assembled to form an outer wall concentric with the core 38. Moreover, the outer wall sections 40a and 40b can be separated after the casting operation so as to enable the removal, or stripping, of the hose body 20 from the core 38. Also, the internal wall surfaces of the outer wall sections 40a and 40b may be embossed so that the embossed surface 30 is formed on the outer wall portion, or skin, 24. The annular space between the outer surface of the core 38 and inner wall surfaces of the wall sections 40a and 40b is intended to contain the foaming elastic material which is to form the tubular body 20. This material when it sets contains the helical coil spring 28 embedded therein. When the foamed elastic material sets it is substantially comprised of a plurality of contiguous closed cells, such as the cells 36 shown at FIG. 9. Also, since the outer peripheral surface of the mold core 38 and the inner peripheral surfaces of the wall sections 40a and 40b have suitable finishes the impervious skins 22 and 24, or outer wall portions, are integrally formed in the body 20 when the foaming elastic material sets. As shown, in the outer periphery of the core 38 there are longitudinal splines 38a which project a slight distance outward from the peripheral surface of the core 38. These splines 38a maintain each of the turns of the helical coil spring 28 at a spaced distance from the outer periphery of the core 38 so that the foaming elastic material can encompass the helical coil spring 28.

FIG. 12 shows how the hose embodiment of FIGS. 5, 6 and 7 can be made. When the helical coil spring 28 encompassing the core 38 is situated coaxially within the semi-circular outer wall sections 40a and 40b of the mold, a force $Th$ is applied to the ends of the helical coil spring 28 so that it is longitudinally tensioned thereby causing its adjacent turns to become spaced further apart. Also, each of the cords 32 is tensioned by a force $Tc$ so as to make these cords 32 taut. After the foaming elastic material has set in the annular space between the core 38 and the outer wall sections 40a and 40b, the forces $Th$ and $Tc$ are relaxed. As a result, the helical coil spring 28 will resume its normal untensioned attitude as shown in FIG. 6 and each of the cords 32 will become relaxed and assume the slackened attitude indicated at FIG. 6; i.e., each of the cords 32 having series of slack portions 32a therein situated between adjacent turns of the helical coil spring 28; the elastic material being compressed slightly between these adjacent turns.

In the circumferentially and longitudinally reinforced hose of FIGS. 5–7 a closed-cell (FIG. 9) cellular elastic material is employed in the casting process hereinbefore described with reference to FIG. 12.

FIGS. 13 and 14 are illustrative of how the hose embodiment of FIG. 4 may be cast. It is to be understood that either open-celled or closed-cell cellular elastic material may be used. As shown at FIGS. 13 and 14 a cylindrical mold core 38b has a thin tube 22a of impervious, elastic material fitted thereover. Also, a larger diameter thin tube 24a of like material is concentrically arranged with respect to the inner tube 22a on the inner wall surfaces of the outer wall sections 40a and 40b of the mold. The tubes 22a and 24a, for example, may be vinyl plastic or the like. As indicated the helical spring 28 is centered in the annular space defined between the tubes 22a and 24a. After the foaming elastic material introduced into this annular space has set, the cellular body 20 is formed; the cellular body 20 having the helical spring 28 embedded therein. Also, the body 20 is bonded to the surfaces of the tubes 22a and 24a. As indicated at FIG. 4, the outer tube 24a may have an embossed surface 30a which, in appearance, simulates the conventional braided jacket often used as a covering for vacuum cleaner suction hose.

It is to be understood that the hose embodiment of FIG. 4 as cast in accordance with the process hereinbefore described with reference to FIGS. 13 and 14 may, if desired, incorporate the longitudinal reinforcing cords 32, as in the hose shown at FIG. 5. To achieve such a hose, the inner and outer tubes 22a and 24a can be longitudinally prestressed by the application of a tensile force thereto when tensile forces such as $Th$ and $Tc$ are applied to the helical coil spring 28 and the cords 32 in the same manner as illustrated in FIG. 12.

While I have shown a number of more or less specific embodiments of my invention, it is to be understood that this has been done for the purpose of illustration only and that the scope of my invention is not to be limited thereby, but is to be determined from the appended claims.

What is claimed is:
1. A hose comprising: a tubular body of cellular elastic material; a thin tubulation of solid elastic material encompassing said tubular body and forming an outer wall portion of the hose; and, a helix of resilient material wholly embedded in said tubular body and extending coaxially with said body and tubulation.
2. A hose comprising: a tubular body of cellular elastic material; a helical coil of resilient material wholly embedded in said body and extending coaxially therewith; and a plurality of cords embedded in said body, each cord extending longitudinally along said body.
3. A flexible conduit comprising: a body of cellular elastic material having a duct extending therethrough; first means wholly embedded in said body and encompassing the duct for circumferentially reinforcing said body; and, second means embedded in said body for longitudinally reinforcing said body.
4. The flexible conduit defined by claim 3 wherein said first means is a helix of resilient material.
5. The flexible conduit defined by claim 3 wherein said second means comprises a plurality of longitudinal cord-like members extending longitudinally in said body, each cord-like member being normally in a slackened condition, some of said members becoming taut and the rest of said members becoming further slackened when said conduit is bent.
6. A flexible suction hose comprising: a long, tubular body of foamed elastic material, said material comprising a plurality of substantially contiguous cells, said body having a long duct extending coaxially therethrough, said tubular body having an outer wall surface comprising impervious elastic material; and, a long, bendable helical coil of resilient material wholly embedded in said tubular body and extending coaxially with said tubular body, said embedded helical coil providing substantial circumferential reinforcement and some longitudinal reinforcement of said tubular body when said tubular body and embedded coil are bent; and a plurality of normally slack cord-like members embedded in said tubular body and extending longitudinally along said long tubular body for providing substantial longitudinal reinforcement of said tubular body, some of said cord-like members becoming taut and other of said cord-like members becoming further slackened when said tubular body, embedded coil and cord-like members are bent.
7. The hose defined by claim 6 wherein a substantial number of said cells of said foamed elastic material are open.
8. The hose defined by claim 6 wherein a substantial number of said cells of said foamed elastic material are closed.
9. The method of casting a flexible hose comprising the steps of: arranging a plurality of longitudinal reinforcing cords lengthwise along the outer surface of a longitudinal section of a helical reinforcing spring; placing said spring and cord arrangement in the longitudinal annular space defined between the outer cylindrical wall and coaxial inner core of a mold; tensioning the spring to elongate it; tensioning the cords longitudinally to make them taut; introducing foamable elastic material into the mold's annular space; foaming said elastic material in said annular space; setting said foaming material to provide a tubular matrix of cellular material in which said spring and cords are embedded and to form impervious skins on the inner and outer wall surfaces of said tubular matrix; removing the tension from said spring and cords; and stripping said matrix with its embedded spring and reinforcing cords from said mold.
10. The method of casting a flexible hose comprising the steps of: placing a tube of impervious elastic material over the central cylindrical core of the mold; placing another larger diameter tube of impervious elastic material against the inner wall surface of a cylindrical mold body within which said tube-covered core is situated to define a longitudinal annular space between said coaxially arranged tubes; placing a longitudinal helical reinforcing spring in said annular space; spacing the coil from the inner wall and from the tube introducing a foamable elastic material into said annular space; foaming said elastic material in said annular space; setting said foaming material to provide a tubular matrix of cellular material which is bonded to said tubes and which contains the spring embedded therein; and stripping said material including the bonded tubes and embedded spring from said mold.

References Cited by the Examiner
UNITED STATES PATENTS

| | | | |
|---|---|---|---|
| 184,907 | 11/1876 | Reed | 138—126 |
| 2,857,931 | 10/1958 | Lawton | 264—45 X |
| 2,879,803 | 3/1959 | Francois | 138—126 |
| 2,962,051 | 11/1960 | Burkes | 138—149 |
| 2,991,808 | 7/1961 | Siegmann et al. | 138—125 X |
| 3,007,203 | 11/1961 | Ammons. | |

FOREIGN PATENTS

| | | |
|---|---|---|
| 836,203 | 6/1960 | Great Britain. |

HENRY T. KLINKSIEK, *Examiner.*

M. CARY NELSON, *Primary Examiner.*